No Printed Specification Available
9661X
S. H. Freeman.
Machine Gearing.
Patented May 17, 1836.
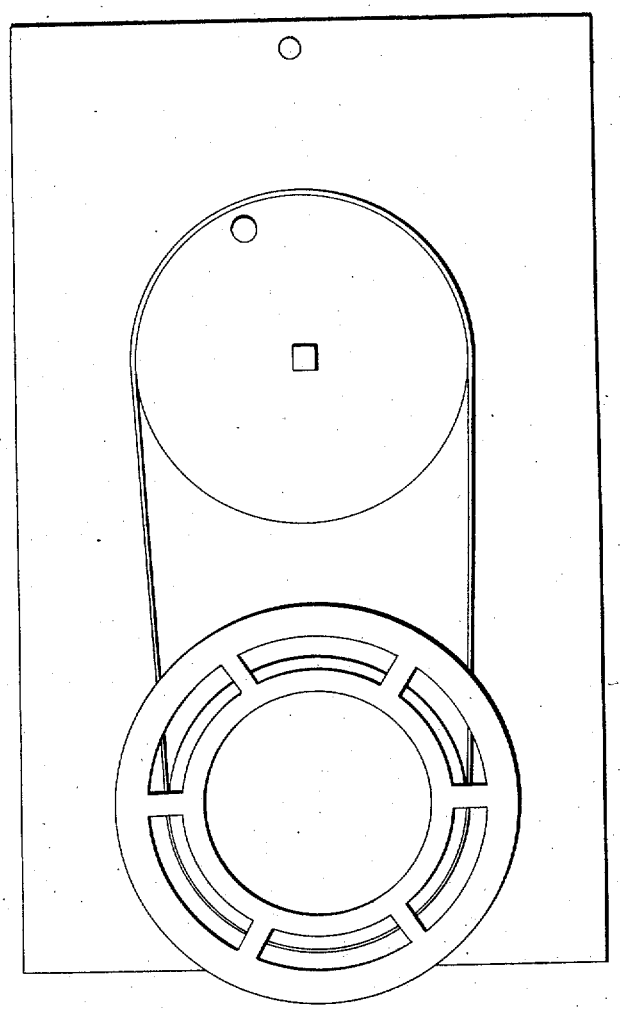
AM. PHOTO-LITHO. CO. N.Y. (OSBORNE'S PROCESS)

9661X

May 17. 1836 333.

Samuel H. Freeman

The Schedule referred to in these Letters Patent, and making part of the same containing a description in the words of the said Samuel H. Freeman himself, of his Improvement in the Regulating Speed Wheel for Grist Mills.

---

Be it known that I Samuel H. Freeman of near Ceciltown in the County of Cecil and State of Maryland have made a new and useful improvement in Grist Mills called Freeman's regulating speed wheel which is described as follows, reference being had to the annexed drawings of the same making part of this specification.—

The improvement in Grist Mills which I have made consists in casting a rim or wheel similar to the one represented at A. and fastening the same on the circumference or periphery of the runner B which is effected by making the runner somewhat conical on the periphery & the rim of a corresponding figure so that when it is slipped upon the runner it will remain fast by its own gravity or it may be secured by wedges or in any other mode preferred. The Mill in other respects is made similar to the common Grist Mill. The advantage derived by the above described construction is to cause the runner to operate more steadily and with greater effect by rendering the motion more uniform & by increasing the momentum. For a farther illustration of my invention I refer to the model of the same deposited in the Patent Office — That which I claim is my invention & which I desire to secure by Letters Patent consists in attaching the before described cast iron rim or wheel to the circumference or periphery of the runner of a Grist Mill.

Witnesses
Wm. P. Elliot
Clement T. Coote

Saml. H. Freeman

[384 words]

(Recd. & Recorded [illegible] Apl. 25. 1837.)

(Patented May 17. 1836